United States Patent

Chaiken

Patent Number: 5,872,995
Date of Patent: Feb. 16, 1999

[54] SYSTEM FOR CAUSING SYSTEM MANAGEMENT INTERRUPT TO EXECUTE SECOND PROGRAM BEFORE USE OF A SCANCODE BY FIRST PROGRAM IF SAID SCANCODE COMPRISES A HOTKEY

[75] Inventor: Craig Chaiken, Tomball, Tex.

[73] Assignee: Compaq Computer Corporation, Houston, Tex.

[21] Appl. No.: 878,687

[22] Filed: Jun. 19, 1997

Related U.S. Application Data

[63] Continuation of Ser. No. 507,808, Jul. 26, 1995, abandoned.

[51] Int. Cl.$^6$ ..................................................... G06F 13/00
[52] U.S. Cl. .......................... 395/825; 395/868; 395/885; 395/887
[58] Field of Search ................................ 395/188.01, 822

[56] References Cited

U.S. PATENT DOCUMENTS

| | | | |
|---|---|---|---|
| 4,517,656 | 5/1985 | Solimeno et al. | 364/900 |
| 4,710,889 | 12/1987 | Enokizono | 364/200 |
| 5,056,057 | 10/1991 | Johnson et al. | 364/900 |
| 5,121,472 | 6/1992 | Danish et al. | 395/887 |
| 5,333,273 | 7/1994 | Raasch et al. | 395/275 |
| 5,371,871 | 12/1994 | Spilo | 395/425 |
| 5,394,519 | 2/1995 | Bodin | 395/131 |
| 5,440,747 | 8/1995 | Kluchi | 395/375 |
| 5,525,978 | 6/1996 | York et al. | 341/22 |
| 5,537,544 | 7/1996 | Morisawa et al. | 395/188.01 |
| 5,551,044 | 8/1996 | Shah et al. | 395/750 |
| 5,613,135 | 3/1997 | Sakai et al. | 395/882 |

OTHER PUBLICATIONS

Computer Dictionary, Microsoft Press, 2nd. ed., 1994, pp. 347–348.

*Primary Examiner*—Thomas C. Lee
*Assistant Examiner*—Anderson T. Chen
*Attorney, Agent, or Firm*—Pravel, Hewitt & Kimball

[57] ABSTRACT

A keyboard scancode signal is processed by the following steps. In response to the scancode signal, and before capture of the scancode signal by a first program that would otherwise interfere with use of the scancode signal by a second program, causing execution of the second program. After execution of the second program, interaction with the first program is permitted.

41 Claims, 6 Drawing Sheets

SYSTEM FOR CAUSING SYSTEM MANAGEMENT INTERRUPT TO EXECUTE SECOND PROGRAM BEFORE USE OF A SCANCODE BY FIRST PROGRAM IF SAID SCANCODE COMPRISES A HOTKEY

This application is a continuation of U.S. application Ser. No. 08/507,808, filed Jul. 26, 1995, now abandoned.

BACKGROUND

This invention relates to keyboard scancode processing.

A computer operator may wish to control her computer's audio functions, e.g., volume, bass, treble or spatializer. While analog dials are sometimes available for audio control, control via hotkeys is more flexible and cheaper to manufacture. Controlling audio functions through keyboard hotkeys is relatively simple. A "hotkey" comprises a control, alt or shift key ("function key") and another key, which, when depressed simultaneously, trigger execution of a previously-defined routine in, e.g., a Terminate & Stay Resident (TSR) Program for controlling the appropriate audio function. Examples of hotkeys could include <alt>-v for volume control, and <cntrl>-<alt>-b for bass control.

The details of how audio functions are controlled by hotkeys is more complex. When the operator presses a key, the keyboard generates a keyboard scancode. In response to the keyboard scancode, the keyboard controller connected to the keyboard raises a keyboard interrupt (IRQ) line connected to one of two Programmable Interrupt Controllers (PICs). By default, under normal operation, this keyboard interrupt line is the second line (IRQ 1) attached to the first PIC. The PIC, upon realizing that IRQ 1 is active, is programmed to generate an interrupt vector number—by default, interrupt vector number 9hex that corresponds to IRQ 1. This interrupt vector number is then transferred to the main CPU. When the CPU receives the interrupt vector number, it looks up the interrupt vector address corresponding to the interrupt vector number and calls the interrupt service routine (ISR) pointed to by the interrupt vector address. For the computer's audio functions, the interrupt service routine would check to see whether one of the computer's hotkeys had been pressed, and if so, would perform one of the computer's audio functions.

With certain DOS applications, however, particularly including video games, when the game is loaded into the computer, the program in essence commandeers the input from the keyboard for its own purposes and prevents the operator from controlling the audio by preventing the audio control routines from ever seeing the keyboard hotkey commands. To do this, the new program replaces the keyboard interrupt vector, stored by the ROM BIOS or DOS TSR program when the computer was initially booted, with a vector pointing to the new program's own interrupt service routine (ISR). Because there is no way to guarantee that the new program's ISR will include, as part of its routine, execution of the old ISR, the old ISR that would otherwise have controlled the computer audio is effectively disabled.

SUMMARY

In general, in one aspect, the invention features processing a scancode signal, by the following steps. In response to the scancode signal, and before capture of the scancode signal by a first program that would otherwise interfere with use of the scancode signal by a second program, causing execution of the second program. After execution of the second program, interaction with the first program is permitted.

Implementations of the invention may include one or more of the following features. The scancode signal may be a hotkey signal generated by a hotkey. The execution of the second program may be caused by a keyboard interrupt directed to a non-default interrupt line. The keyboard interrupt may trigger an interrupt service routine. The execution of the second program may be caused by an interrupt service routine which reads the scancode signal, determines whether a keyboard hotkey was activated, and executes a control routine associated with the keyboard hotkey. The second program may be one that controls an audio function of a computer. The step of permitting the interaction with the first program may be caused by triggering a second interrupt, e.g., by simulating activation of a standard interrupt line corresponding to the scancode signal. The first program may be a game application.

The execution of the second program may be caused by a system management interrupt, triggered by a keyboard interrupt corresponding to the scancode signal. The system management interrupt may read the scancode signal, determine whether a keyboard hotkey was activated, and execute a control routine associated with the keyboard hotkey. The interaction with the first program is caused by a system management interrupt. Permitting interaction with the first program may be caused by duplicating the scancode signal, e.g., by duplicating a keyboard interrupt corresponding to the scancode signal. The execution of the second program may be caused by directing a computer to commandeer subsequent scancode signals to the exclusion of the first program. Permitting the interaction with the first program may be caused by directing a computer to cease commandeering subsequent scancode signals to the exclusion of the first program. The computer may treat the subsequent scancode signals as hotkeys.

In general, in another aspect, the invention features apparatus for processing a keyboard scancode signal that occurs during interaction with a first program. The apparatus includes means for intercepting the scancode signal; and means for triggering a non-default interrupt, corresponding to the scancode signal, to enable interaction with a second program.

Among the advantages of the invention may be one or more of the following. The operator may control the audio while using a program that would otherwise prevent the audio functions from being controlled, without hampering the performance of the commandeering program. The scheme prevents the ROM BIOS or DOS TSR programs from relinquishing complete control of the keyboard. Thus, audio functions may be controlled through hotkey operations for all software applications.

Other advantages and features will become apparent from what follows.

DESCRIPTION

Figure 1:
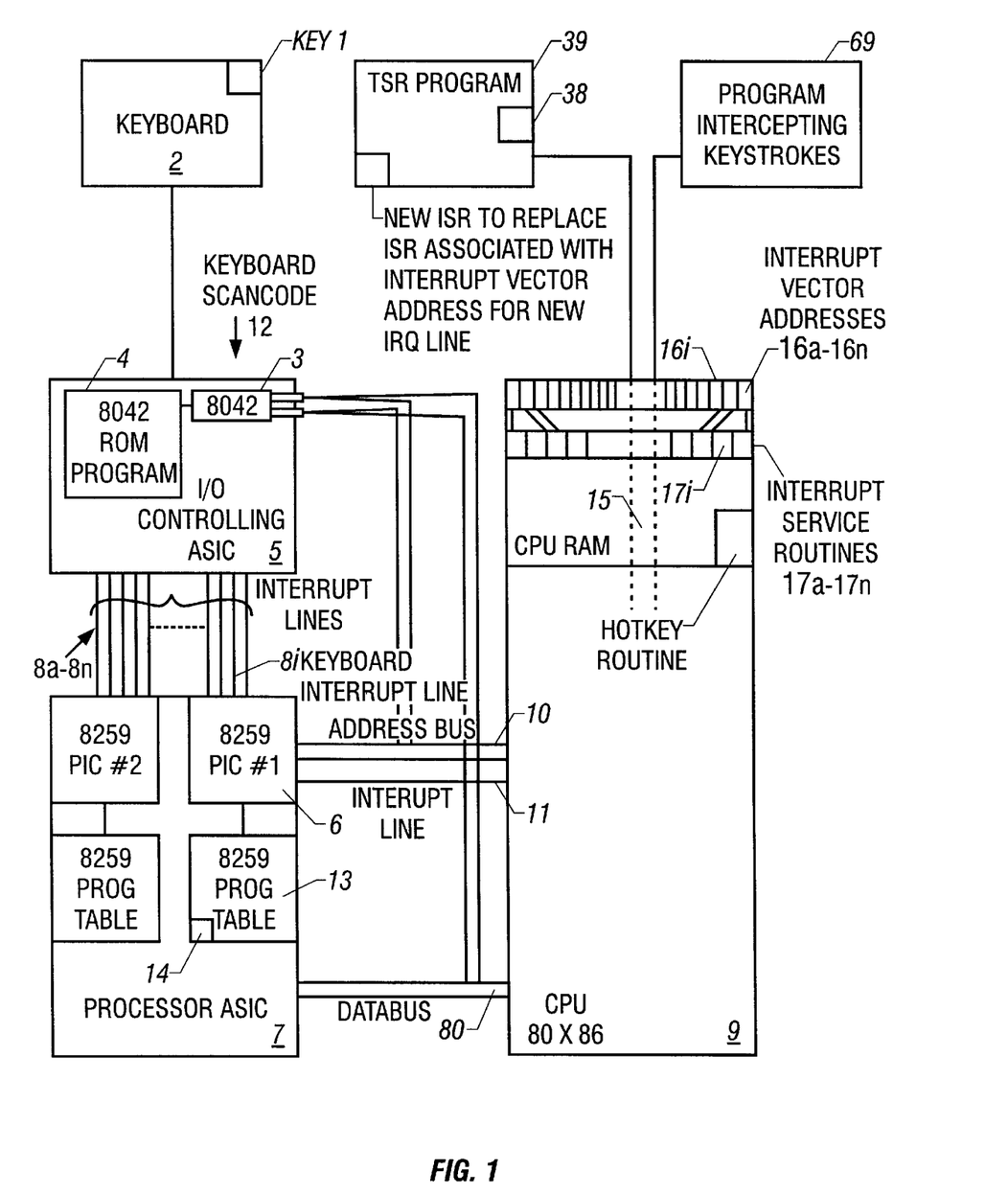
FIG. 1 is a block diagram of hardware for processing keyboard scancode signals.
Figure 2:
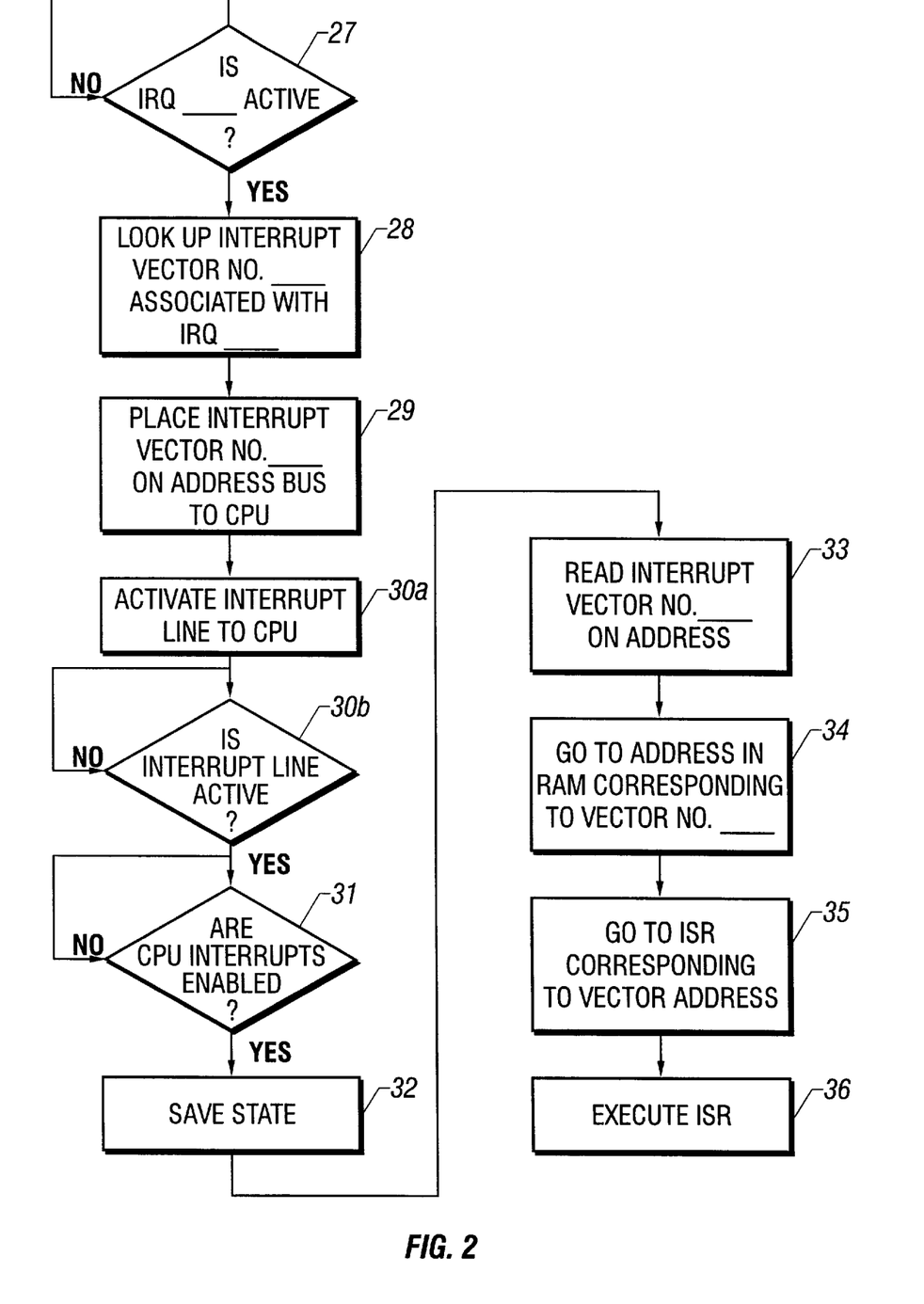
FIG. 2 is a chart of the flow of a keyboard scancode processing routine.
Figure 3:
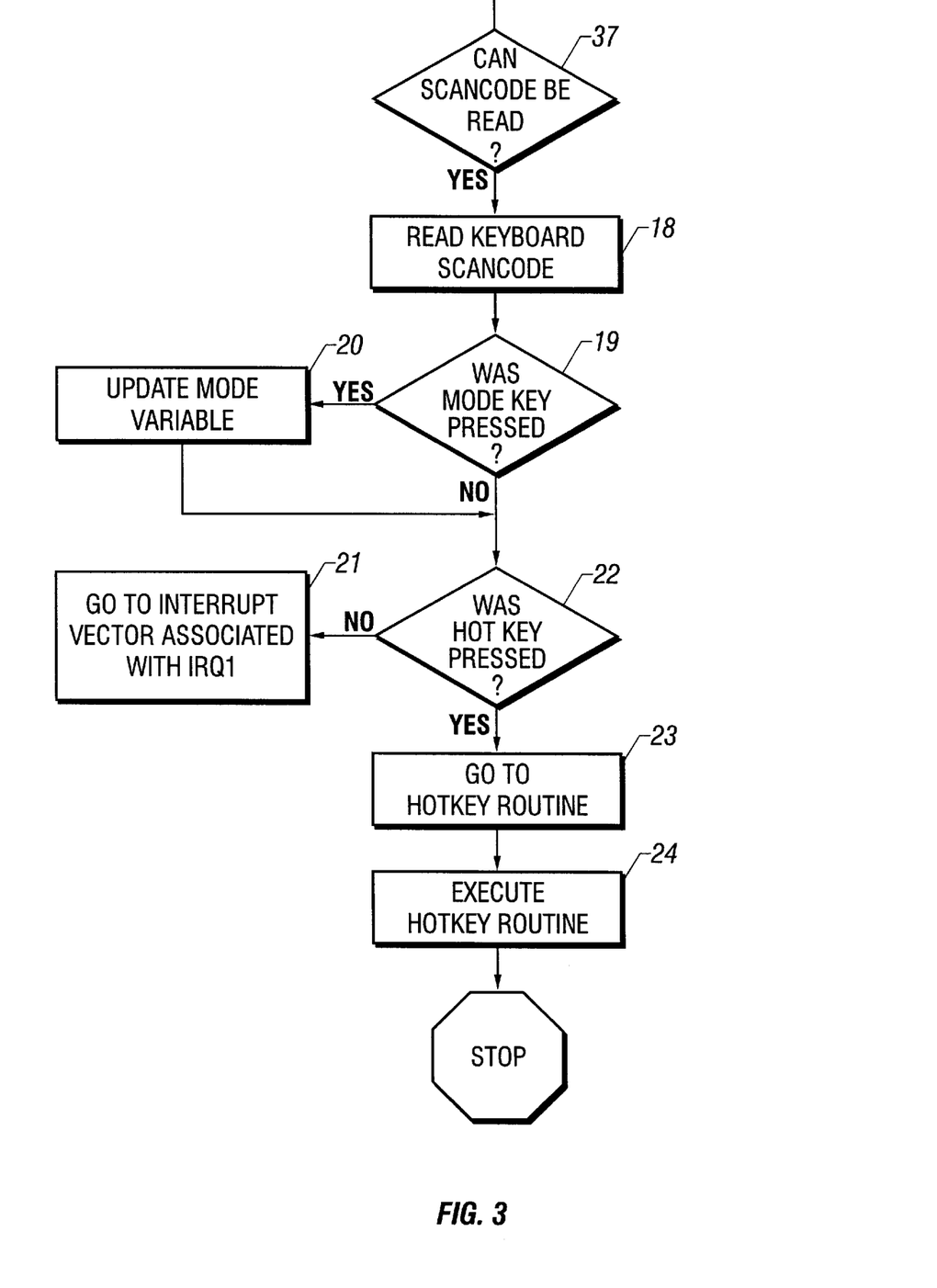
FIG. 3 is a chart of the flow of an interrupt service routine.

As seen in FIGS. 1, 2, and 3, keyboard 2 with, e.g., key 1 is connected to an Intel 8042 keyboard controller microprocessor 3. The keyboard controller 3 and its ROM program 4 are imbedded in an input/output (I/O) controlling Application-Specific Integrated Circuit (ASIC) 5. The keyboard controller 3 is connected to an Intel 8259 Programmable Interrupt Controller (PIC) 6, which is imbedded in a processor chipset ASIC 7, by multiple interrupt (IRQ) lines 8a–8n, one of which, 8i, may be chosen for use as a keyboard IRQ. The PIC is connected to an Intel 80×86-compatible CPU 9, by both address 10 and data 88 buses and an interrupt line 11.

When a computer operator presses key 1 on the keyboard 2, the keyboard 2 generates a keyboard scancode 12 corresponding to the pressed key 1. The keyboard controller 3 has two I/O mapped read/write ports: a 60hex port 25 where the scancode is stored upon receipt and a 64hex status port 26 which indicates whether the scancode data are available for reading. These two I/O mapped ports are connected to the CPU's address 10 and data 88 buses. Upon receiving the keyboard scancode 12, the keyboard controller 3 raises a keyboard interrupt (IRQ) on line 8i. Instead of defaulting to the second keyboard interrupt line (IRQ 1), however, the I/O controlling ASIC 5 is programmed to choose an alternate keyboard IRQ line (IRQ 9), 8i, which is then activated by the keyboard controller.

When the PIC 6 detects 27 the activated alternate IRQ line 8i, the PIC 6 searches 28 its programmable table 13 for an interrupt vector number 14 associated with the activated alternate IRQ line 8i. The PIC 6 then places 29 the interrupt vector number 14 onto the address bus 10 connecting the PIC 6 to the CPU 9. The PIC 6, connected to the activated IRQ 8i, then activates 30b the interrupt line 11 connected to the CPU 9, which informs the CPU that an interrupt vector number 14 is on the address bus 11. The CPU 9 has a RAM 15 which contains user-programmable interrupt vector addresses 16a–16n, each of which is associated with an interrupt vector number. Each interrupt vector address points the CPU towards a corresponding interrupt service routine (ISR) 17a–17n. If the CPU 9 interrupts are enabled 31 when the CPU's interrupt line 11 is activated 30b by the PIC 6, the CPU saves its addresses and flags (saves state) 32, reads 33 the interrupt vector number 14 from the address bus 10, and uses the interrupt vector number 14 to look up 34 the corresponding interrupt vector address 16i in its RAM 15.

The interrupt vector address 16i corresponding to the interrupt vector number 14 associated with the alternate IRQ line 8i points 35 the CPU 9 to the address 16i in RAM where the CPU is to begin executing 36 the corresponding ISR 17i. When executed, the ISR 17i first checks the keyboard controller's status port 26 to determine 37 whether the keyboard scancode data are available for reading. If so, the ISR reads 18 the keyboard scancode 12 from the keyboard controller's 60hex I/O port 25. Once the scancode 12 has been read off the 60hex I/O port 25, the I/O port is free to accept another keyboard scancode from another keystroke. If the data are not available for reading, the ISR simulates activation 21 of the standard IRQ (IRQ 1) signal by jumping to the interrupt vector associated with IRQ 1.

The ISR 17i then determines 19 whether the operator pressed a mode key (shift, control or alt). If so, the ISR 17i updates a mode variable 20 to indicate that a mode key was pressed. If a mode key was not pressed, or after the mode variable has been updated 20, the ISR 17i then determines 22 whether the operator pressed a hotkey by comparing the current status of the mode variable together with the scancode 12 read from the keyboard controller's 60hex port 25 to a table of values 38 stored in the Terminate & Stay Resident (TSR) Program 39. If a hotkey was pressed, the ISR is directed 23 to execute the routine 24 associated with that hotkey. Once the hotkey routine has been executed 24, the ISR terminates and returns control to the application program 69. By doing so, the final scancode, corresponding to the final keystroke of the hotkey, is not transmitted to the application program 69.

If a hotkey was not pressed, then the ISR simulates activation 21 of the standard IRQ 1 in the same manner as previously described. The ISR thereby enables the scancode for the mode key to be passed to the application program 69 because the program does not yet know whether the pending hotkey command ultimately will concern an audio function or an application program function. An example of a TSR that controls the audio functions of a computer and handles the interrupts generated by the first embodiment appears in Appendix A to this application.

Since a mode key triggers a scancode (and therefore an interrupt) during both the make and break phases of a keystroke, the ISR can be programmed to trigger off either the make or break phases of the keystroke. Also, the ISR may be programmed to prevent transmission of the scancodes, which in combination do not constitute a hotkey, to the application program through simulation of IRQ 1, until the ISR finally determines whether a hotkey in the TSR table has been pressed. Once it has so determined, the ISR need not transmit any of the keystrokes constituting the hotkey to the application program because they have already been used to control an audio function.

Other embodiments are within the scope of the following claims. For example, instead of having the keyboard controller generate a signal on an alternate IRQ line 8i, a processor chipset may be altered, either through hardware modification or programming, to trigger a system management interrupt (SMI) when a particular IRQ line is activated so that the SMI performs the same function as the ISR in the first embodiment.

Figure 4:
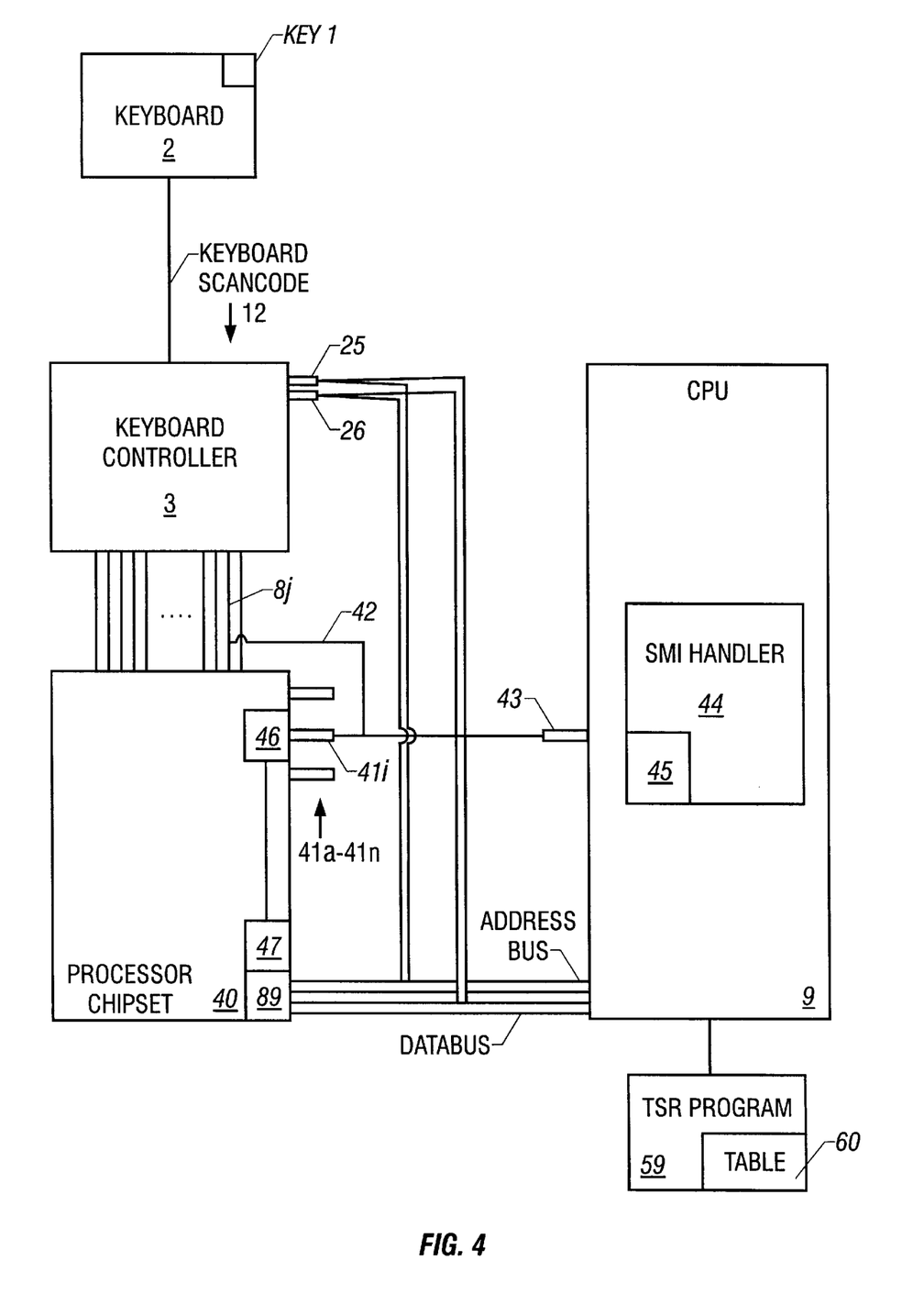
FIG. 4 is a block diagram of alternate hardware for prosing keyboard scancode signals.
Figure 5:
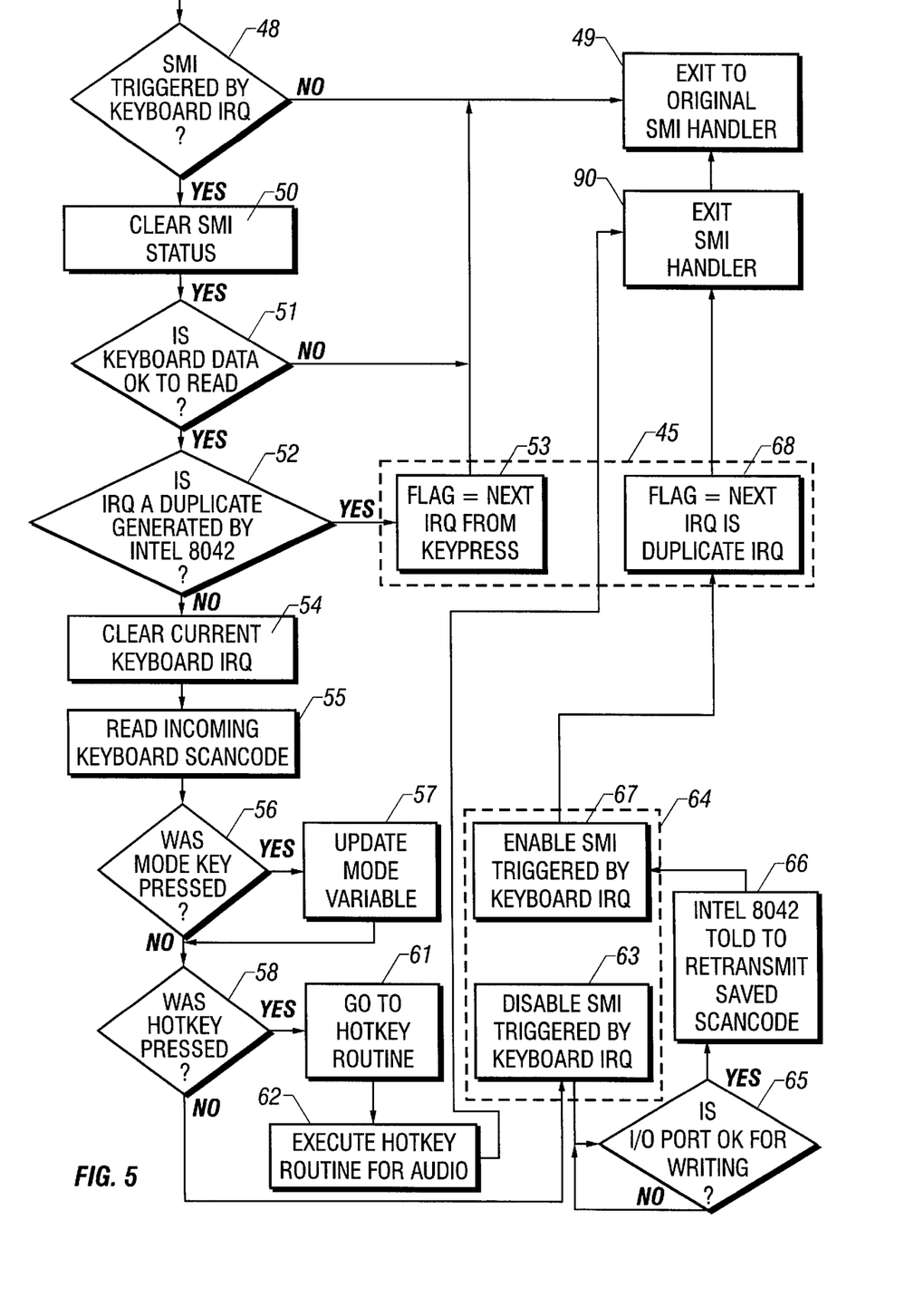
FIG. 5 is a block diagram of SMI handler functions.

As shown in FIGS. 4 and 5, a processor chipset 40 has one or more external power management interrupt (EPMI) pins 41a–41n. To enable the processor chipset 40 to generate an SMI when an IRQ line 8j is activated, a parallel signal 42 is run from the IRQ line 8j to one EPMI pin 41i, so that the EPMI pin 41i is activated when the IRQ line 8j is activated. The EPMI pin on the processor chipset is connected to an SMI pin 43 on the CPU 9. When the EPMI pin 41i is activated, the SMI pin 43 on the CPU 9 is also activated. Once the SMI pin 43 is activated, an SMI is triggered and the SMI handler 44 handles the SMI generated by the keyboard IRQ 8j.

The SMI handler 44 has a flag 45 indicating the source of the IRQ. This flag has two settings, the first indicating that the next keyboard IRQ will be an original keyboard IRQ generated by an actual keystroke, and the second indicating that the next keyboard IRQ will be a duplicate IRQ.

For the SMI handler to be ready to handle an SMI generated by an IRQ, it needs to be initialized when the computer is booted. The additional initialization code has two main functions. First, it sets the flag 45 to indicate that the next keyboard IRQ will be an original keyboard IRQ generated by an actual keystroke, and second, it enables, through processor chipset modification, the generation of an SMI when a keyboard interrupt occurs. At least one currently available processor chipset, VLSI 483FC6, may be programmed to generate an SMI when a particular IRQ occurs. In processor chipsets where such programming is not possible, the parallel signal 42 from the IRQ 8i to an EPMI pin 41i connected to the SMI pin 43 performs the same function.

When the operator presses a key 1, the keyboard 2 generates a keyboard scancode 12 corresponding to the pressed key 1. Upon receiving the scancode 12, the keyboard controller 3 stores the scancode at its 60hex port 25, and raises a keyboard interrupt (IRQ) line 8i. Activation of the IRQ line also triggers the EPMI pin 41i on the processor chipset 40, which causes an SMI status flag 47 to indicate an SMI. Activation of the EPMI pin 41i in turn activates the SMI pin 43 on the CPU 9, which triggers the onset of an SMI.

For the SMI handler 44 to be able to control the computer's audio functions, additional functions are added to the existing SMI handler ("additional SMI routine") as follows.

The processor chipset 40 maintains a register 46 which indicates whether an SMI was caused by an IRQ. Once the SMI is triggered, the SMI handler 44 first determines 48 whether an IRQ caused the SMI by checking the status of register 46. If so, the SMI status flag 47 on the processor chipset is cleared 50 to allow future SMIs, because additional SMIs cannot be processed until the current SMI is cleared. If the SMI was not caused by an IRQ, the SMI handler exits 49 the additional SMI routine and resumes normal SMI procedure. Once the SMI status has been cleared 50, the SMI handler determines 51 whether keyboard data are available for reading by checking the 64hex I/O port 25 on the keyboard controller 3. If the keyboard data are not available for reading, the SMI handler exits 49 the additional SMI routine and resumes normal SMI procedure.

After determining that the data are available for reading, the SMI then checks 52 flag 45 to determine whether the IRQ 8j is either an original keyboard IRQ generated by a keystroke, or a duplicate IRQ generated by a keyboard controller resend character command. If a duplicate IRQ, the flag 45 is reset 53, indicating that the next IRQ will be generated by a keystroke, and the SMI handler exits 49 the SMI. If an original keyboard IRQ, the SMI then clears 54 the current keyboard IRQ by resetting the IRQ flag 89 on the processor chipset 40, because a duplicate IRQ will later be generated by the SMI for use in the application programs that would otherwise prevent operation of the audio functions.

The additional SMI routine then performs the same functions as the ISR in the first embodiment. The SMI reads 55 the keyboard scancode 12 by accessing the keyboard controller's 60hex I/O mapped port 25. The SMI then determines 56 whether the operator pressed a shift, control or alt key (mode key). If so, the SMI updates a mode variable 57 to indicate that a mode key was pressed. If a mode key was not pressed, or after the mode variable has been updated 57, the SMI then determines 58 whether the operator pressed a hotkey by comparing the current status of the mode variable together with the scancode 12 read from the keyboard controller's 60hex port 25 to a table of values 59 stored in the Terminate & Stay Resident (TSR) Program 60. If a hotkey was pressed, the SMI is directed 61 to execute 62 the routine 24 associated with that hotkey and then immediately exit 90 the SMI handler so that a duplicate IRQ corresponding to the final keystroke is not ordered to be sent by the keyboard controller for use by the application program.

If a hotkey was not pressed, the SMI handler disables 63 all SMIs triggered by IRQs by setting a flag 64 on the processor chipset 40 so that when the keyboard controller 3 is told to resend the scancode, another SMI is not triggered by the accompanying IRQ. The SMI handler then determines 65 whether the I/O mapped port 25 is available for writing by checking the I/O status port 26. If the controller returns a status indicating that port 25 is available, the keyboard controller is commanded 66 to retransmit the saved scancode by using the Intel 8042 resend command. The SMI handler 67 then re-enables SMIs triggered by IRQs by resetting flag 64 on the processor chipset 40. Then, the SMI sets 68 flag 45 indicating that the next keyboard IRQ will be a duplicate IRQ, so that when the SMI triggered by the duplicate IRQ determines the cause of the SMI, it will recognize it as duplicative and abort. Finally, the SMI handler terminates 90 the additional SMI routine. Because the duplicate IRQ is not commandeered by an SMI other than to check whether the SMI was in fact caused by the duplicate IRQ, the application program receives the duplicate IRQ without knowledge that the IRQ has been duplicated.

The previous embodiments require that the hotkeys used to control the audio functions be unique from any keystrokes used to control the application program. If a hotkey could be used to control both the computer's audio functions and a function in the application program, a hotkey command intended by the operator to control an audio function could also adversely affect the application if passed to the program. Conversely, a hotkey command intended to control the application program would be diverted to control the audio functions and would never get to the application. To meet the possible need for multiple uses for the same hotkey command, the following scheme assures that no hotkey combination is inaccessible while multiple environment hotkey support is enabled.

First, two infrequently-used keys are selected, e.g., F11 and F12. Whether a key is infrequently-used will depend on the applications to be driven by the keyboard. These keys are used respectively to enable and disable "hotkey mode." It is also possible to use a single key both to enable and disable the hotkey mode. For F11 and F12 to continue to be able to control other functions while in hotkey mode, the F11 and F12 scancodes can be generated indirectly, while in hotkey mode, by pressing F1 and F2, respectively. Unless hotkey mode is enabled, all other key combinations are accessible by the application program. Hotkey mode does not pause the active application in any way, but instead simply switches the keyboard away from the active application, permitting only the ROM BIOS has access to keystrokes.

Figure 6:
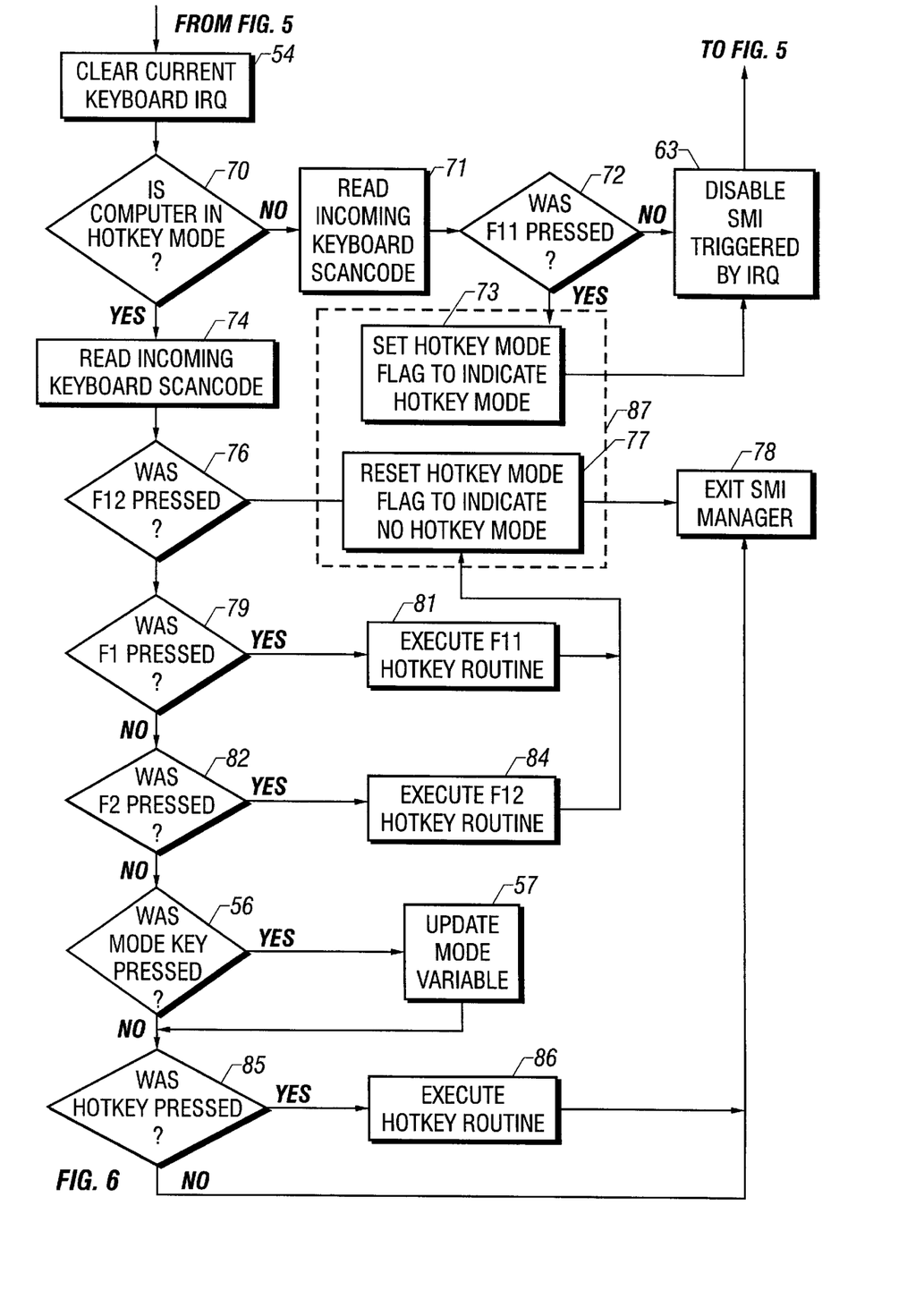
FIG. 6 is a chart of the flow of an alternative keyboard scancode processing routine.

As described in the second embodiment, when a key is pressed, an SMI is generated. The SMI then proceeds through the same procedure as described for FIG. 5, until it gets to the point where it clears the current keyboard IRQ 54. Referring to FIG. 6, once the IRQ is cleared 54, the SMI determines 70 whether the computer is in hotkey mode by checking a hotkey mode flag 87 stored in the RAM 15. The flag 87 is initialized to indicate no hotkey mode. If the hotkey mode flag 87 indicates that there is no hotkey mode, the SMI reads 71 the scancode and then determines 72 whether F11 was pressed, to determine whether to enter hotkey mode. If F11 was not pressed, then the SMI disables 63 the SMI triggered by the IRQ and continues as depicted in FIG. 5. If, however, F11 was pressed, the computer enters hotkey mode by setting 73 the hotkey mode flag 87 in RAM 15, before proceeding to disable 63 the SMI.

If the hotkey mode flag 87 indicates that the computer is in hotkey mode, the SMI then reads 74 the scancode and determines 76 whether F12 was pressed. If so, the SMI resets 77 the hotkey mode flag 87 and exits 78 the SMI handler. If F12 was not pressed, then the SMI determines 79 whether F1 was pressed. If so, the SMI executes 81 the hotkey routine for F11, resets 77 the hotkey mode flag 87 and exits the SMI handler 78. If F1 was not pressed, the SMI then determines 82 whether F2 was pressed. If so, the SMI executes 84 the hotkey routine for F12, resets 77 the hotkey mode flag 87 and exits the SMI handler 78. If F2 was not pressed, the SMI then determines 56 whether a mode key (cntrl, alt or shift) was pressed. If so, the mode variable is updated 57. If not, or after updating 57 the mode variable, the SMI determines 85 whether a hotkey was pressed. If so, the SMI is directed 86 to execute the hotkey routine corresponding to the pressed hotkey. After execution, or if a hotkey was not pressed, the SMI handler is exited.

In addition to enabling control of a computer's audio functions, the invention also enables control of other functions, such as CDROM-track selection; TV tuner-channel selection; keyboard macros; power management; security; en/disable data logging (keyboard input, printer output, serial I/O, display output, network I/O); en/disable status logging (hard disk, floppy disk, network errors); display scrollback; debugger; calculator; clock; en/disable print spooler; enhanced print screen; speakerphone used as dictaphone; runtime diagnostics; hibernation in which current state is stored in a disk file; lockup recovery; and on-line dictionary.

Other advantages and features will become apparent from the following descriptions and from the claims.

```
;*********************************************************
;*  I2C Tone Control TSR          (I2C.ASM, I2C.COM)     *
;*                                                        *
;*  by Craig Chaiken                                      *
;*  February 13, 1995                                     *
;*                                                        *
;*  Command Format:                                       *
;*      I2CTSR                                            *
;*                                                        *
;********************************************************* codeseg  segment byte
         assume  cs:codeseg,ds:codeseg,es:codeseg
         org     100h
start:   call    echo
         db      'I2CTSR Version 1.2.0',13,10
         db      'Copyright 1995 Compaq Corporation',13,10,10,0
         jmp     install ;* Variables * windows         db      0
hotkey_table    label
zero_all        dw      82Ch    , pzero_all
restore_all     dw      0c20h   , prestore_all
volume_up       dw      82fh    , pvolume_up
volume_down     dw      82fh    , pvolume_down
bass_up         dw      830h    , pbass_up
bass_down       dw      0c30h   , pbass_down
treble_up       dw      814h    , ptreble_up
treble_down     dw      0c14h   , ptreble_down
lvolume_up      dw      826h    , plvolume_up
lvolume_down    dw      0c26h   , plvolume_down
rvolume_up      dw      815h    , prvolume_up
rvolume_down    dw      0c15h   , prvolume_down
spatial_on      dw      81fh    , pspatial_on
spatial_off     dw      0c1fh   , pspatial_off
                dw      0       , 0 old_int9h_vector  label   dword
old_int9h_offs    dw      ?
old_int9h_seg     dw      ?
old_int2fh_vector label   dword
old_int2fh_offs   dw      ?
old_int2fh_seg    dw      ?

include misc.mod
        include console.mod

;*** Sub Address List ***

Volume_Left     equ     00110010b
Volume_Right    equ     00110010b
Bass            equ     00010000b
Treble          equ     00010010b
Fader           equ     00000100b
Audio_Switch    equ     01000000b ;* Default Values for Each Sub Address *

Def_Volume_Left  equ    00110010b
Def_Volume_Right equ    00110010b
Def_Bass         equ    00010000b
Def_Treble       equ    00010010b
Def_Fader        equ    00000000b
Def_Audio_Switch equ    01000000b
```

```
R_Volume_Data   label   byte
L_Volume_Data   label   byte
                db      00110101b
                db      00110100b
                db      00110011b
                db      00110010b
                db      00110001b
                db      00110000b
                db      00101111b
                db      00101110b
                db      00101101b
                db      00101100b
                db      00101011b
                db      00101010b
                db      00101001b
                db      00101000b
                db      00100111b
                db      00100110b
                db      00100101b
                db      00100100b
                db      00100011b
                db      00100010b
                db      00100001b
                db      00100000b
                db      00011111b
                db      00011110b
                db      00011101b
                db      00011100b
                db      00011011b
                db      00011010b
                db      00011001b
                db      00011000b
                db      00010111b
                db      00010110b
                db      00010101b
                db      00010100b
                db      00010011b
End_R_Volume_Data label byte
End_L_Volume_Data label byte Bass_Data       label   byte
                db      00001111b
                db      00001110b
                db      00001101b
                db      00001100b
                db      00001011b
                db      00001010b
                db      00010001b
                db      00010000b
                db      00010111b
End_Bass_Data   label   byte Treble_Data     label   byte
                db      00001111b
                db      00001110b
                db      00001101b
                db      00001100b
                db      00001011b
                db      00001010b
                db      00010001b
                db      00010000b
                db      00000111b
End_Treble_Data label   byte
```

APPENDIX A

```
R_Volume_Setting    dw      3+offset R_Volume_Data
L_Volume_Setting    dw      3+offset L_Volume_Data
Bass_Setting        dw      4+offset Bass_Data
Treble_Setting      dw      1+offset Treble_Data
ppdatareg           equ     0e4h
PPstatusreg         equ     0e4h
PPcontrolreg        equ     0e4h pbass_up:
        mov     al,Bass
        cmp     word ptr cs:Bass_Setting,offset Bass_Data
        jz      ignore
        dec     cs:Bass_Setting
        mov     bx,cs:Bass_Setting
        mov     ah,cs:[bx]
        jmp     Send_I2C_Command pbass_down:
        mov     al,Bass
        cmp     word ptr cs:Bass_Setting,offset End_Bass_Data-1
        jz      ignore
        inc     cs:Bass_Setting
        mov     bx,cs:Bass_Setting
        mov     ah,cs:[bx]
        jmp     Send_I2C_Command ptreble_up:
        mov     al,Treble
        cmp     word ptr cs:Treble_Setting,offset Treble_Data
        jz      ignore
        dec     cs:Treble_Setting
        mov     bx,cs:Treble_Setting
        mov     ah,cs:[bx]
        jmp     Send_I2C_Command ignore: ret pzero_all:
        mov     al,Volume_Left
        mov     ah,00110101b
        call    Send_I2C_Command
        mov     al,Volume_Right
        mov     ah,00110101b
        call    Send_I2C_Command
        mov     al,Bass
        mov     ah,00000111b
        call    Send_I2C_Command
        mov     al,Treble
        mov     ah,00000111b
        call    Send_I2C_Command
        ret prestore_all:
        mov     al,Volume_Left
        mov     bx,cs:L_Volume_Setting
        mov     ah,cs:[bx]
        call    Send_I2C_Command
        mov     al,Volume_Right
        mov     bx,cs:R_Volume_Setting
        mov     ah,cs:[bx]
        call    Send_I2C_Command
        mov     al,Bass
        call    Send_I2C_Command
        mov     bx,cs:Bass_Setting
```

```
        mov     ah,cs:[bx]
        call    Send_I2C_Command
        mov     al,Treble
        mov     bx,cs:Treble_Setting
        mov     ah,cs:[bx]
        call    Send_I2C_Command
        ret ptreble_down:
        mov     al,Treble
        cmp     word ptr cs:Treble_Setting,offset End_Treble_Data-1
        jz      ignore
        inc     cs:Treble_Setting
        mov     bx,cs:Treble_Setting
        mov     ah,cs:[bx]
        jmp     Send_I2C_Command plvolume_up:
        mov     al,Volume_Left
        cmp     word ptr cs:L_Volume_Setting,offset L_Volume_Data
        jz      ignore
        dec     cs:L_Volume_Setting
        mov     bx,cs:L_Volume_Setting
        mov     ah,cs:[bx]
        jmp     Send_I2C_Command plvolume_down:
        mov     al,Volume_Left
        cmp     word ptr cs:L_Volume_Setting,offset End_L_Volume_Data-1
        jz      ignore
        inc     cs:L_Volume_Setting
        mov     bx,cs:L_Volume_Setting
        mov     ah,cs:[bx]
        jmp     Send_I2C_Command prvolume_up:
        mov     al,Volume_Right
        cmp     word ptr cs:R_Volume_Setting,offset R_Volume_Data
        jz      ignore
        dec     cs:R_Volume_Setting
        mov     bx,cs:R_Volume_Setting
        mov     ah,cs:[bx]
        jmp     Send_I2C_Command prvolume_down:
        mov     al,Volume_Right
        cmp     word ptr cs:R_Volume_Setting,offset End_R_Volume_Data-1
        jz      ignore
        inc     cs:R_Volume_Setting
        mov     bx,cs:R_Volume_Setting
        mov     ah,cs:[bx]
        jmp     Send_I2C_Command pvolume_up:
        mov     al,Volume_Left
        cmp     word ptr cs:L_Volume_Setting,offset L_Volume_Data
        jz      ignore
        dec     cs:L_Volume_Setting
        mov     bx,cs:L_Volume_Setting
        mov     ah,cs:[bx]
        call    Send_I2C_Command
        mov     al,Volume_Right
        word ptr cs:R_Volume_Setting,offset R_Volume_Data
        jz      ignore
        dec     cs:R_Volume_Setting
        mov     bx,cs:R_Volume_Setting
```

```
ignorel:   mov   ah,cs:[bx]
           jmp   Send_I2C_Command
           ret pvolume_down:
           mov   al,Volume_Left
           cmp   word ptr cs:L_Volume_Setting,offset End_L_Volume_Data-1
           jz    ignorel
           inc   cs:L_Volume_Setting
           mov   bx,cs:L_Volume_Setting
           mov   ah,cs:[bx]
           call  Send_I2C_Command
           mov   al,Volume_Right
           cmp   word ptr cs:R_Volume_Setting,offset End_R_Volume_Data-1
           jz    ignorel
           inc   cs:R_Volume_Setting
           mov   bx,cs:R_Volume_Setting
           mov   ah,cs:[bx]
           jmp   Send_I2C_Command pspatial_on:
           pushf
           push  ax
           mov   al,6ch
           out   70h,al
           in    al,71h
           test  al,80h
           jnz   no_ess
           and   al,01100000b
           shr   al,1
           xor   ah,ah
           add   ax,227h
           mov   dx,ax
           mov   al,dh
           out   85h,al
           mov   al,dl
           out   84h,al
           in    al,dx
           and   al,11111101b
           out   dx,al
           pop   ax
           popf
           ret pspatial_off:
           pushf
           push  ax
           mov   al,6ch
           out   70h,al
           in    al,71h
           test  al,80h
           jnz   no_ess
           and   al,01100000b
           shr   al,1
           xor   ah,ah
           add   ax,227h
           mov   dx,ax
           mov   al,dh
           out   85h,al
           mov   al,dl
           out   84h,al
           in    al,dx
           or    al,00000010b
           out   dx,al
no_ess:    pop   ax
           popf
           ret
```

```
           popf
           ret
;****************************************************************
;* CLOCK CYCLE PROCEDURES
;   sendl, send0, send_I2C_start, send_I2C_stop, read_bit
;****************************************************************
;send1   HOST SENDS A 1
send1      proc  near
           call  SDA1                 ;data bit=1
           call  delaySCL1delay       ;rising clock edge
           call  delaySCL0delay       ;trailing clock edge
           ret
send1      endp ;send0   HOST SENDS A 0
send0      proc  near
           call  SDA0                 ;data bit=0
           call  delaySCL1delay       ;rising clock edge
           call  delaySCL0delay       ;trailing clock edge
           ret
send0      endp ;send_I2C_start
;       START SIGNAL
send_I2C_start proc near
           push  ax
           call  SDA1                 ;set data line high
           call  delaySCL1delay       ;rising clock edge
           call  SDA0                 ;(start)
           call  delaySCL0delay       ;trailing clock edge
           pop   ax
           ret
send_I2C_start endp ;send_I2C_stop
;       STOP SIGNAL
send_I2C_stop proc near
           push  ax
           call  SDA0                 ;set data line low
           call  delaySCL1delay       ;rising clock edge
           call  SDA1                 ;(stop)
           call  delaySCL1delay       ;trailing clock edge
           call  delaySCL0delay       ;both SDA and SCL released by the host
           pop   ax                   ;I2C bus no longer active
           ret
send_I2C_stop endp ;read_bit
;       READS SDA AND RETURNS ITS VALUE
;       VALUE OF SDA (0 OR 1) RETURNED IN DL
read_bit   proc  near
           call  SDA1                 ;ensure SDA not pulled down by host
           call  delaySCL1delay       ;leading clock edge
           call  readSDAstatus        ;dl contains value of SDA (0 or 1)
           call  delaySCL0delay       ;trailing clock edge
           ret
```

```
read_bit endp

;***********************************************************
;*** BI-DIRECTIONAL BUS PROTOCOL FCNS.
;***
;*** The following procedures, in addition to the start and stop
;*** procedures do all that is necessary to read and write to the
;*** Microchip 24LC21 EEPROM using I2C protocol.
;***********************************************************

;receive_I2C
;    READ ONE BYTE FROM EEPROM
;    CALL WITH 01h IN AL IF ACK SHOULD BE GENERATED ON 9TH CLOCK CYCLE
;    CALL WITH 00h IN AL IF ACK SHOULD NOT BE GENERATED ON 9TH CLOCK
;    BYTE READ IS RETURNED IN AL receive_I2C proc near
    push    cx
    push    dx
    push    ax mov     al,00h          ;clear al (result accumulated here)

mov     cx,8            ;8 clocks in which data is read
receive_mkbyte:
    call    read_bit        ;cycle to read SDA (dl = 0 or 1)
    shl     al,1            ;shift over to make room for next bit
    add     al,dl           ;add in the bit read
    loop    receive_mkbyte pop     dx              ;load dx w/contents of ax at call
    or      dl,dl           ;change flags
    jnz     short receive_generate_ack  ;if al=00h at call, don't generate ac
=> k
    call    sendl           ;generate a not ack clock cycle
    jmp     short exit_receive receive_generate_ack:
    call    send0           ;generate ack clock cycle exit_receive:
    pop     dx
    pop     cx
    ret
receive_I2C endp ;send_test4ack
;    SEND ONE BYTE TO EEPROM, LOOKING FOR AN ACKNOWLEDGE FROM THE EEPROM
;    ON THE NINTH CLOCK CYCLE
;    CALL WITH THE BYTE TO BE SENT IN DL
;    AT EXIT, CF SET IF ERROR (ACK NOT RECEIVED)
;             CF CLEAR IF NO ERROR
;    NOTE: DL IS NOT RESTORED TO ITS VALUE AT PROCEDURE CALL
send_test4ack proc near
    push    ax
    push    cx
    mov     cx,8            ;save cx
sendbit:
    shl     dl,1            ;shift msb of dl into carry flag
    jnc     short zero_send_test4ack  ;if carry=0 send a zero
    call    sendl           ;otherwise, send a one
    jmp     short continue_send_test4ack zero_send_test4ack:
    call    send0 continue_send_test4ack:
ifdef   '836
;'836
else
;'830
    call    sendbit
    loop    SHORT sendbit
endif
;'b30
    call    read_bit        ;cycle to get ack from EEPROM
    or      dl,dl           ;test to change flags
    clc                     ;default: no error
    jz      short exit_send_test4ack  ;if dl=0, acknowledge received, continue
    stc                     ;set CF if error exit_send_test4ack:
    pop     cx              ;restore cx
    pop     ax
    ret                     ;return with error status in CF
send_test4ack endp ;**********************************************************
;* BIT MANIPULATION PROCEDURES
;*  SDA0, SDA1, delaySCL0delay, delaySCL1delay, readSDAstatus
;**********************************************************

;SDA0
;    WRITES 1 TO AUFDXT* CONTROL BIT, PULLING SDA (AUFDXT*) LOW
SDA0    proc    near
    push    ax
    push    dx
    mov     dx,PPcontrolreg         ;PP control register
    in      al,dx                   ;get current state
    or      al,0FDh                 ;(bit 1)=0 -> AUFDXT* pin high
    out     dx,al
    pop     dx
    pop     ax
    ret
SDA0    endp ;SDA1
;    WRITES 0 TO AUFDXT* CONTROL BIT, ALLOWING SDA (AUFDXT*) TO GO HIGH
;    (IF SDA NOT PULLED DOWN BY MONITOR)
SDA1    proc    near
    push    ax
    push    dx
    mov     dx,PPcontrolreg         ;PP control register
    in      al,dx                   ;get current state
    or      al,02h                  ;(bit 1)=1 -> AUFDXT* pin low
    out     dx,al
    pop     dx
    pop     ax
    ret
SDA1    endp ;delaySCL0delay
;    PLACES PARALLEL PORT STRB* PIN LOW (STRB* = SCL)
;    (NOTE: PIN STATUS IS INVERTED W.R.T. REGISTER CONTENTS)
delaySCL0delay proc near
```

```
            call    delay
            push    ax
            push    dx
            mov     dx,PPcontrolreg    ;PP control register
            in      al,dx              ;get current state
            and     al,0FBh            ;(bit 01=0 -> STRB* pin high
            out     dx,al
            pop     dx
            pop     ax
            call    delay
            ret
delaySCL0delay endp ;delaySCL1delay
;   PLACES PARALLEL PORT STRB* PIN HIGH (STRB* = SCL)
;   (NOTE:  PIN STATUS IS INVERTED W.R.T. REGISTER CONTENTS)

delaySCL1delay  proc    near
            call    delay
            push    ax
            push    dx
            mov     dx,PPcontrolreg    ;PP control register
            in      al,dx              ;get current state
            or      al,01h             ;(bit 0)=1 -> STRB* pin low
            out     dx,al
            pop     dx
            pop     ax
            call    delay
            ret
delaySCL1delay  endp ;readSDAstatus
;   RETURNS STATUS OF SDA LINE (0 OR 1) IN DL
;   (NOTE:  TO SUCCESSFULLY READ FROM THE RECEIVER, SDA1 MUST FIRST
;    BE EXECUTED BECAUSE THE BUFFERED OUTPUT OF AUFDXT* IS CONNECTED
;    DIRECTLY TO THE SLCT PARALLEL PORT PIN THAT IS READ BY THIS PROC.)

readSDAstatus  proc  near
            push    ax
            mov     dx,PPcontrolreg    ;get contents of PP status register
            in      al,dx
            shr     al,1
            and     al,1
            mov     dl,al
            pop     ax
            ret
readSDAstatus  endp ;************************************************************
;* MISCELLANEOUS PROCEDURES
;************************************************************

;delay   SHOULD BE A MINIMUM OF 2.5 us TO MEET I2C SPEC delay   proc    near
            push    ax
            in      ax,84h
            in      ax,84h
            in      ax,84h
            in      ax,84h
            in      ax,84h
            in      ax,84h
            pop     ax
            ret
delay   endp public  Init_I2C
Init2Ctable label   byte
            db      Volume_left,   Def_Volume_left
            db      Volume_Right,  Def_Volume_Right
            db      Bass,          Def_Bass
            db      Treble,        Def_Treble
            db      Fader,         Def_Fader
            db      Audio_Switch,  Def_Audio_Switch Send_I2C_Command proc near           ;AL=Slave Address, AH=Data
            call    send_I2C_start
            mov     dl,10000000b
            call    send_test4ack
            push    ax
            mov     ah,al
            out     85h,al
            mov     dl,al
            call    send_test4ack
            pop     ax
            mov     al,ah
            mov     dl,ah
            out     84h,al
            call    send_test4ack
            call    send_I2C_stop
            ret
Send_I2C_Command endp Init2Clen = ($-Init2Ctable)/2
Init_I2C    proc    near
            mov     cx,Init2Clen
            mov     si,offset Init2Ctable
ag:         mov     ax,cs:[si]
            add     si,2
            call    send_I2C_command
            loop    ag
            ret
Init_I2C    endp process_key proc    near
            ret
process_key endp mode    db      0

;Table of mode keys modetable   label   byte
            db      54          ;RIGHT SHIFT key
            db      42          ;LEFT SHIFT key
            db      29          ;CTRL key
            db      56          ;ALT key
            db      70          ;SCROLL_LOCK key
            db      69          ;NUM_LOCK key
            db      58          ;CAPS_LOCK key
            db      82          ;INS key set_mode    proc    near
            push    ax
            push    cx
```

```
            push    dx
            push    si
            mov     si,offset modetable
            mov     cx,8
            mov     ah,al
            mov     dl,1
            mov     dh,not 1
mode_loop:
            cmp     al,cs:[si]
            jnz     aa
            or      af
            or      end_mode
aa:
            mov     ah,80h
            or      ah,ah
            cmp     al,ah
            jnz     af
            and     cs:mode,dh
            jmp     end_mode
aa:
            inc     si
            shl     dl,1
            mov     dh,0ffh
            sub     dh,dl
            loop    mode_loop
end_mode:
            pop     si
            pop     dx
            pop     cx
            pop     ax
            ret
set_mode    endp get_mode    proc    near
            mov     al,cs:mode
            ret
get_mode    endp new_int9h   proc    far
            pushall
            mov     di,offset hotkey_table
            mov     al,60h
            in      bl,al
            mov     set_mode
            call    get_mode
            and     bh,al
            and     bh,0ch
new_ia:
            mov     cx,cs:[di]
            add     di,4
            cmp     cx,0
            jz      new_ie
            cmp     bl,cl
            jnz     new_ia
            cmp     bh,ch
            jnz     new_ia
            mov     cs:[di-2]
            mov     al,20h
            out     20h,al
            mov     al,0A0h
            out     0A0h,al
            popall
            iret
new_ie:     int     9h
```

*This executes at IRQ 9*

```
            mov     al,0A0h
            out     0A0h,al
            popall
            iret
new_int9h   endp new_int9h   proc    far
            sti
            pushall
            mov     di,offset hotkey_table
            cmp     cs:windows,1
            jnz     newin_if
            mov     al,60h
            in      bl,al
            call    set_mode
            call    get_mode
            mov     bh,al
            and     bh,0ch
newin_ia:
            mov     cx,cs:[di]
            add     di,4
            cmp     cx,0
            jz      newin_ie
            cmp     bl,cl
            jnz     newin_ia
            cmp     bh,ch
            jnz     newin_ia
            call    cs:[di-2]
newin_ie:
            popall
newin_if:
            jmp     cs:old_int9h_vector
            iret
new_int9h   endp new_int2fh  proc    near
            cmp     ax,1605h            ;Windows Init Broadcast?
            jnz     int2f1
            push    ax
            mov     byte ptr cs:windows,1
            out     0fdh,al
            mov     al,7
            out     0eah,al
            mov     al,7
            out     0eah,al
            mov     al,70h
            out     0eah,al
            mov     al,1                ;Keyboard IRQ=1
            out     0edh,al
            out     019h,al
            pop     ax
            jmp     int2f2
int2f1:
            cmp     ax,1606h            ;Windows Exit Broadcast?
            jnz     int2f2
            push    ax
            mov     byte ptr cs:windows,0
            out     0fdh,al
            mov     al,7
            out     0eah,al
            mov     al,7
            out     0eah,al
            mov     al,70h
            out     0eah,al
            mov     al,9                ;Keyboard IRQ=9
            out     0edh,al
```

*This executes at IRQ 1*

```
        out     019h,al
        pop     ax
int2f2:
        jmp     cs:old_int2fh_vector
new_int2fh endp ;* Install New Interrupt Handler *
;************************************* intinst proc    near
        cli
        push    cs
        pop     ds mov     ax,352fh
        int     21h
        mov     old_int2fh_offs,bx
        mov     old_int2fh_seg,es
        mov     ax,252fh
        mov     dx,offset new_int2fh
        int     21h
        mov     ax,3509h
        int     21h
        mov     old_int9h_offs,bx
        mov     old_int9h_seg,es
        mov     ax,2509h
        mov     dx,offset newin_int9h
        int     21h
        mov     ax,257h
        mov     dx,offset new_int9h
        int     21h
        out     010h,al
        out     0eah,al
        mov     al,7
        out     0eah,al
        mov     al,70h
        out     0eah,al
        mov     al,9
        out     0edh,al
        out     019h,al
        sti
        ret
intinst endp install proc    near
        mov     si,80h
        call    get_opt
        jb      default
        mov     cs:tptdev,cx
        call    get_opt
        jb      default
        mov     cs:hotkey,cx
        call    get_opt
        jb      default
        mov     cs:vidseg,cx
default: call   intinst
        push    cs
        pop     ds
        mov     dx,offset install
        int     27h
install endp codeseg ends
        end     start ;* End of I2C.ASM *
;**********************
```

What is claimed is:

1. A method for processing a scancode signal comprising:
   receiving a scancode signal before use of the scancode signal by a first program;
   reaching a determination whether the scancode signal comprises part of a particular hotkey combination,
   until the determination is reached, preventing use of the scancode signal by the first program,
   if the determination is reached that the scancode signal does not comprise part of a particular hotkey combination, permitting use of the scancode signal by the first program,
   if the determination is reached that the scancode signal does comprise part of the particular hotkey combination, triggering a system management interrupt to cause execution of the second program, and thereafter permitting operation of the first program.

2. The method of claim 1 wherein the scancode signal comprises a hotkey signal.

3. The method of claim 1 wherein the scancode signal is generated by a hotkey.

4. The method of claim 1 wherein the second program controls an audio function of a computer.

5. The method of claim 1 wherein permitting operation of the first program is caused by triggering a second interrupt.

6. The method of claim 1 wherein permitting operation of the first program is caused by simulating activation of a standard interrupt line corresponding to the scancode signal.

7. The method of claim 1 wherein the first program comprises a game.

8. The method of claim 1 wherein the system management interrupt is triggered by a keyboard interrupt corresponding to the scancode signal.

9. The method of claim 1 wherein the system management interrupt comprises:
   reading the scancode signal;
   determining whether a keyboard hotkey was activated; and
   executing a control routine associated with the keyboard hotkey.

10. The method of claim 1 wherein permitting operation of the first program is caused by a system management interrupt.

11. The method of claim 1 wherein permitting operation of the first program is caused by duplicating the scancode signal.

12. The method of claim 1 wherein permitting operation of the first program is caused by duplicating a keyboard interrupt corresponding to the scancode signal.

13. The method of claim 1 wherein the execution of the second program is caused by directing a computer to commandeer subsequent scancode signals to the exclusion of the first program.

14. The method of claim 1 wherein permitting operation of the first program is caused by directing a computer to cease commandeering subsequent scancode signals to the exclusion of the first program.

15. The method of claim 14 wherein the computer treats the subsequent scancode signals as hotkeys.

16. The method of claim 1 wherein the first program intercepts a keyboard interrupt vector after the second program.

17. An apparatus for processing a keyboard scancode signal that occurs during interaction with a first program that would use the scancode comprising:
    circuitry connected to intercept the scancode signal;
    circuitry connected to trigger a non-default interrupt corresponding to the scancode signal to enable interaction with a second program that would use the same scancode signal;
    circuitry connected to reach a determination whether the scancode signal comprises part of a particular hotkey combination;
    circuitry connected to prevent use of the scancode signal by the first program until the determination is reached; and
    circuitry connected to trigger a system management interrupt to permit use of the scancode signal by the first program if the determination is reached that the scancode signal does not comprise part of the particular hotkey combination.

18. A method for processing a hotkey signal, comprising:
    receiving a hotkey signal before use of the hotkey signal by a running first program that would otherwise interfere with use of the same hotkey signal by a second program,
    generating a keyboard interrupt;
    triggering a non-default keyboard interrupt line;
    triggering a system management interrupt to cause execution of a non-default interrupt service routine; and
    simulating activation of a standard keyboard interrupt line to permit interaction with the first program.

19. A method for processing a hotkey signal, comprising:
    in response to the hotkey signal, and before use of the hotkey signal by a running first program that would otherwise interfere with use of the signal by a second program, generating a keyboard interrupt;
    triggering a system management interrupt; and
    if the second program uses the hotkey signal,
       causing execution of the second program,
    otherwise, to permit interaction with the first program,
       duplicating the keyboard interrupt, and
       checking whether the system management interrupt was caused by a duplicate keyboard interrupt.

20. A computer program for processing a scancode signal, comprising:
    instructions which, in response to the scancode signal, reach a determination whether the scancode signal comprises a particular hotkey combination,
    instructions which prevent use of the scancode signal by the first program until the determination is reached,
    if the determination is reached that the scancode signal does not comprise part of the particular hotkey combination, instructions which permit use of the scancode signal by the first program,
    if the determination is reached that the scancode signal does comprise part of the particular hotkey combination, instructions to trigger a system management interrupt which causes execution of the second program, and
    instructions which thereafter permit interaction with the first program.

21. A method for processing a scancode signal, comprising:
    receiving a scancode signal before use of the scancode signal by a first program that would otherwise interfere with use of the scancode signal by a second program,
    causing execution of the second program with a keyboard interrupt directed to a non-default interrupt line; and
    after execution of the second program, permitting operation of the first program by triggering a second interrupt.

22. An apparatus for processing a keyboard scancode signal that occurs during interaction with a first program that would use the scancode, comprising:

means for intercepting the scancode signal;

means for triggering a non-default interrupt, corresponding to the scancode signal, to enable interaction with a second program that would use the same scancode;

means for reaching a determination whether the scancode signal comprises part of a particular hotkey combination;

means for preventing use of the scancode signal by the first program until the determination is reached; and means for triggering a system management interrupt for permitting use of the scancode signal by the first program if the determination is reached that the scancode signal does not comprise part of the particular hotkey combination.

23. A computer system comprising:

a keyboard which generates a scancode signal during user interaction with a first program that would use the scancode;

circuitry connected to intercept the scancode signal;

circuitry connected to trigger a non-default interrupt, corresponding to the scancode signal, to enable interaction with a second program that would use the same scancode;

circuitry connected to reach a determination whether the scancode signal comprises a particular hotkey combination;

circuitry connected to prevent use of the scancode signal by the first program until the determination is reached;

circuitry connected to permit use of the scancode signal by the first program if the determination is reached that the scancode signal does not comprise part of the particular hotkey combination;

circuitry connected to trigger a system management interrupt signal if the determination is reached that the scancode signal does comprise part of the particular hotkey combination; and a central processor connected to respond to the system management interrupt signal, before use of the scancode signal by the first program, by executing the second program and thereafter permitting operation of the first program.

24. The apparatus of claim 23, further comprising a storage medium holding the first and second programs.

25. A computer system comprising:

means for generating a signal during user interaction with a first program that would use the signal;

means for intercepting the signal;

means for triggering a non-default interrupt, corresponding to the signal, to enable interaction with a second program that would use the same signal;

means for reaching a determination whether the signal comprises a particular hotkey signal;

means for preventing use of the signal by the first program until the determination is reached;

means for permitting use of the signal by the first program if the determination is reached that the signal does not comprise part of the particular hotkey signal;

means for triggering a system management interrupt if the determination is reached that the signal does comprise the particular hotkey signal; and means for responding to the system management interrupt, before use of the signal by the first program, by executing the second program and thereafter permitting operation of the first program.

26. A method for processing a scancode signal comprising:

receiving a scancode signal before use of the scancode signal by a first program;

if the scancode signal does not comprise part of a particular hotkey combination, permitting use of the scancode signal by the first program; and if the scancode signal does comprise part of the particular hotkey combination, triggering a system management interrupt to cause execution of the second program, and thereafter permitting operation of the first program.

27. The method of claim 26 wherein the scancode signal comprises a hotkey signal.

28. The method of claim 26 wherein the scancode signal is generated by a hotkey.

29. The method of claim 26 wherein the second program controls an audio function of a computer.

30. The method of claim 26 wherein permitting operation of the first program is caused by triggering a second interrupt.

31. The method of claim 26 wherein permitting operation of the first program is caused by simulating activation of a standard interrupt line corresponding to the scancode signal.

32. The method of claim 26 wherein the first program comprises a game.

33. The method of claim 26 wherein the system management interrupt is triggered by a keyboard interrupt corresponding to the scancode signal.

34. The method of claim 26 wherein the system management interrupt comprises:

receiving the scancode signal;

determining whether a keyboard hotkey was activated; and executing a control routine associated with the keyboard hotkey.

35. The method of claim 26 wherein permitting operation of the first program is caused by a system management interrupt.

36. The method of claim 26 wherein permitting operation of the first program is caused by duplicating the scancode signal.

37. The method of claim 26 wherein permitting operation of the first program is caused by duplicating a keyboard interrupt corresponding to the scancode signal.

38. The method of claim 26 wherein the execution of the second program is caused by directing a computer to commandeer subsequent scancode signals to the exclusion of the first program.

39. The method of claim 26 wherein permitting operation of the first program is caused by directing a computer to cease commandeering subsequent scancode signals to the exclusion of the first program.

40. The method of claim 26 wherein the computer treats the subsequent scancode signals as hotkeys.

41. The method of claim 26 wherein the first program intercepts a keyboard interrupt vector after the second program.

* * * * *